United States Patent [19]

Bell

[11] Patent Number: 5,022,226
[45] Date of Patent: Jun. 11, 1991

[54] LOW $NO_x$ COGENERATION PROCESS AND SYSTEM

[75] Inventor: Ronald D. Bell, Austin, Tex.

[73] Assignee: Radian Corporation, Austin, Tex.

[21] Appl. No.: 499,165

[22] Filed: Mar. 26, 1990

Related U.S. Application Data

[63] Continuation-in-part of Ser. No. 252,690, Oct. 3, 1988, Pat. No. 4,930,305.

[51] Int. Cl.$^5$ .............................................. F01N 3/18
[52] U.S. Cl. ...................................... 60/274; 60/298; 60/301; 60/320
[58] Field of Search ................... 60/274, 298, 301, 320

[56] References Cited

U.S. PATENT DOCUMENTS

| | | | |
|---|---|---|---|
| 3,000,707 | 9/1961 | Barstow . | |
| 3,896,616 | 7/1975 | Keith | 60/301 |
| 3,908,371 | 9/1975 | Nagai | 60/301 |
| 3,953,576 | 4/1976 | Meguerian | 60/301 |
| 4,106,286 | 8/1978 | Sakai et al. . | |
| 4,164,546 | 8/1979 | Welty, Jr. . | |
| 4,354,821 | 10/1982 | Kesselring et al. . | |
| 4,405,587 | 9/1983 | McGill et al. . | |
| 4,572,110 | 2/1986 | Haeflich . | |
| 4,811,555 | 3/1989 | Bell | 60/39.5 |

Primary Examiner—Douglas Hart
Attorney, Agent, or Firm—Klauber & Jackson

[57] ABSTRACT

A process and system for low $NO_x$ cogeneration to produce electricity and useful heat. Fuel and oxygen are provided to an internal combustion engine connected to drive an electric generator, to thereby generate electricity. An exhaust stream is recovered from the engine at a temperature of about 500° to 1000° F. which includes from about 6 to 15 percent oxygen. Fuel is added to the exhaust stream to create a fuel-rich mixture, the quantity of fuel being sufficient to react with the oxygen and reduce the $NO_x$ in said exhaust stream. The fuel-enriched stream is provided to an afterburner, and the fuel, $NO_x$ and available oxygen are reacted to provide a heated oxygen-depleted stream. The oxygen-depleted stream is cooled in a heat exchanger. Conversion oxygen is admixed with the cooled stream which is then passed over a catalyst bed under overall reducing conditions. NO is converted to $NO_2$ at the forward end of the bed, and the $NO_2$ then reacts on the remainder of the bed with excess combustibles. Air is added to the resulting stream from the catalyst bed to produce a cooled stream having a stoichiometric excess of oxygen, and the cooled stream is passed over an oxidizing catalyst bed to oxidize remaining combustibles. The resultant low $NO_x$ stream can then be provided for venting.

17 Claims, 1 Drawing Sheet

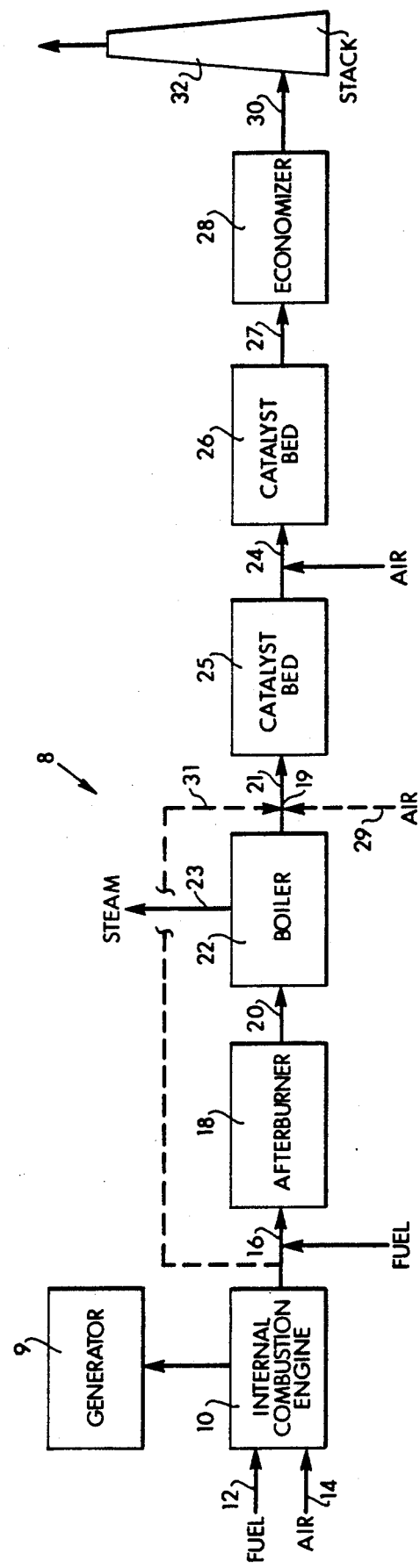

LOW NO$_x$ COGENERATION PROCESS AND SYSTEM

REFERENCE TO RELATED APPLICATION

This application is a continuation-in-part of my copending application Ser. No. 252,690, filed Oct. 3, 1988, now U.S. Pat. No. 4,930,305.

FIELD OF THE INVENTION

This invention relates generally to cogeneration methods and apparatus, and more specifically relates to a cogeneration process and system which employs an internal combustion engine as the primary power source, while ensuring extremely low NO$_x$ content in the final exhaust gases vented to ambient.

BACKGROUND OF THE INVENTION

Numerous of the combustion processes incident to power generation, generate as well as an undesired product, effluent gases having an unacceptable NO$_x$ content. More specifically, the high temperatures incident to the operation of fuel-driven turbines, internal combustion engines and the like, results in the fixation of some oxides of nitrogen. These compounds are found in the effluent gases mainly as nitric oxide (NO) with lesser amounts of nitrogen dioxide (NO$_2$) and only traces of other oxides. Since nitric oxide (NO) continues to oxidize to nitrogen dioxide (NO$_2$) in the air at ordinary temperatures, there is no way to predict with accuracy the amounts of each separately in vented gases at a given time. Thus, the total amount of nitric oxide (NO) plus nitrogen dioxide (NO$_2$) in a sample is determined and referred to as "oxides of nitrogen" (NO$_x$).

NO$_x$ emissions from stack gases, engine exhausts etc., through atmospheric reactions, produce "smog" that stings eyes and may cause or contribute to acid rain. Other deleterious effects both to health and to structures are believed to be caused directly or indirectly by these NO$_x$ emissions. For these reasons, the content of oxides of nitrogen present in gases vented to the atmosphere has been subject to increasingly stringent limits via regulations promulgated by various state and federal agencies.

In recent years a mode of power production known as "cogeneration" has expanded rapidly, due in part to the Public Utility Regulatory Policy Act of 1978 (PURPA). PURPA provided financial incentive to cogenerators that sell excess electrical power and indeed mandated that utilities purchase power from cogenerators. It also allows utilities to own up to 50% of a cogeneration facility and receive the benefits of this status. Cogeneration may be defined as the simultaneous production of both useful thermal energy (usually steam), and electrical energy, from one source of fuel. In a typical system one or more power sources such as gas turbines, may be followed by a waste heat boiler using natural gas as fuel for both the turbines and to heat the exhaust gases from the turbines.

A common problem arising in cogeneration systems is the level of NO$_x$ emissions generated with the combined firing cycle. Cogeneration plants using conventional hydrocarbon-fueled power sources and auxiliary fuel fired heat-recovery boilers to produce electricity and steam are therefore being subjected to stringent NO$_x$ emission standards requiring levels below the 150 ppmv range.

To meet the regulations for NO$_x$ emissions, a number of methods of NO$_x$ control have previously been employed or proposed. In one approach water or steam are injected into the combustion zone. This lowers the flame temperature and thereby retards the formation of NO$_x$, since the amount of NO$_x$ formed generally increases with increasing temperatures. Water or steam injection, however, adversely affects the overall fuel efficiency of the process as energy is absorbed to vaporize the water or heat the injectable steam, which would otherwise go toward heating the power source exhaust and be ultimately converted into usable steam.

It is also known to inject ammonia to selectively reduce NO$_x$. A process involving the injection of ammonia into the products of combustion is shown, for example, in Welty, U.S. Pat. No. 4,164,546. Examples of processes utilizing ammonia injection and a reducing catalyst are disclosed in Sakari et al, U.S. Pat. No. 4,106,286; and Haeflich, U.S. Pat. No. 4,572,110. However, selective reduction methods using ammonia injection are expensive and somewhat difficult to control. Thus, these methods have the inherent problem of requiring that the ammonia injection be carefully controlled so as not to inject too much and create a possible emission problem by emitting excess levels of ammonia. In addition the temperature necessary for the reduction of the oxides of nitrogen must be carefully controlled to yield the required reaction rates.

Apparatus modifications have also been widely used or proposed as a solution to the aforementioned NO$_x$ emission problem. These include modifications to the burner or firebox to reduce the formation of NO$_x$. Although these methods can reduce the level of NO$_x$, each has its own drawbacks. Combustion equipment modifications can e.g. affect performance and limit the range of operation.

A selective catalytic reduction system is presently considered by some to be the best available control technology for the reduction of NO$_x$ from the exhaust gas of a cogeneration plant and, as a consequence, is often required equipment. Currently available selective catalytic reduction systems used for the reduction of NO$_x$ employ ammonia injection into the exhaust gas stream for reaction with the NO$_x$ in the presence of a catalyst to produce nitrogen and water vapor. Such systems typically have an efficiency of 80–90 percent when the exhaust gas stream is at a temperature within a temperature range of approximately 600°–700° F. The NO$_x$ reduction efficiency of the system is significantly less if the temperature is outside the stated temperature range and the catalyst may be damaged at higher temperatures.

A further approach to reducing NO$_x$ levels from combustion processes, is based on combustion staging. Thus a fuel-rich primary stage may be followed by secondary air addition and completion of combustion at a later stage.

Reference may be had in this connection to McGill et al, U.S. Pat. No. 4,405,587, for which the present Applicant is a co-patentee. As disclosed therein, oxides of nitrogen can be reduced by reaction in a reducing atmosphere at temperatures in excess of 2000° F., for example 2000° to 3000° F.

U.S. Pat. No. 4,354,821 is also of interest in disclosing a system for combusting a nitrogen-containing fuel in such a manner as to minimize NO$_x$ formation. The fuel to be combusted is directed through a series of combustion zones having beds of catalytic materials. Air is added to each of two upstream zones to provide fuel-rich conditions to thereby minimize formation of $NO_x$ precursors. In a final zone also having a bed of catalytic material, excess air is provided to complete combustion of the fuel.

In my U.S. Pat. No. 4,811,555, for which this application is a continuation-in-part, there is disclosed a cogeneration system wherein electrical power is generated by a gas turbine. The gaseous effluent from the turbine, together with sufficient additional fuel to produce a fuel-rich, fuel-air mixture is fed to a boiler to generate steam. Air is added to the gaseous effluent from the boiler to form a lean fuel-air mixture, and this mixture is passed over an oxidizing catalyst, with the resultant gas stream then passing to an economizer or low pressure waste heat boiler for substantial recovery of its remaining heat content. The gas, now meeting NOX emission standards, is then vented to atmosphere.

It will be appreciated that in my said U.S. Pat. No. 4,811,555, a gas turbine constitutes the primary power source. The $NO_x$ levels ultimately achieved therein is quite low, i.e. below about 50 ppmv for the final gases provided for venting. Since, however, $NO_x$ levels in the turbine exhaust are not extremely high to begin with (i.e. about 150 ppmv), the actual reduction is only moderate. Where an internal combustion engine (such as a diesel) constitutes the power source, $NO_x$ levels in the exhaust are an order of magnitude higher than in a gas turbine—a typical $NO_x$ level for such an engine being about 1500 ppmv. In this instance the exhaust stream also carries substantial particulate matter in the form of unburned carbon. It is found that with such a power source, neither the methods taught in my U.S. Pat. No. 4,811,555, or those otherwise known in the prior art are adequate or effective to economically and efficiently achieve fully acceptable $NO_x$ reduction. The problem thereby presented is particularly acute, in that the convenience, simplicity of operation, and dependability of internal combustion engines, otherwise renders same an ideal instrumentality for use in cogeneration installations, e.g. for shopping centers, industrial plants, educational facilities, medical complexes, and the like.

In accordance with the foregoing, it may be regarded as an object of the present invention, to provide a cogeneration method and system wherein the primary power source is an internal combustion engine, and wherein the quantity of $NO_x$ in the fuel emissions to atmosphere is reduced to a completely safe and acceptable level.

It is another object of the invention to provide a cogeneration system of the foregoing character, wherein $NO_x$ emissions are controlled without adversely affecting the operation of the power source or fuel efficiency of the system.

It is a further object of the invention, to provide in a cogeneration system employing an internal combustion engine, wherein $NO_x$ emissions are reduced to a very low level by means which are more economical and more readily controlled than means heretofore employed in the cogeneration art.

BRIEF SUMMARY OF THE INVENTION

In accordance with the invention, a cogeneration system is provided wherein fuel and oxygen are provided to an internal combustion engine connected to drive an electric generator, to thereby generate electricity. An exhaust stream is recovered from the engine at a temperature of about 500° to 1000° F. which includes from about 6 to 15 percent oxygen. Sufficient fuel is added to the exhaust stream to create a fuel-rich mixture, the quantity of fuel being sufficient to react with the available oxygen and reduce the $NO_x$ in the exhaust stream. The fuel-enriched stream is then provided to a thermal reactor means for reacting the fuel, $NO_x$ and available oxygen, to provide a heated oxygen-depleted stream. The oxygen-depleted stream is cooled in a heat exchanger. Prior to being passed over a catalyst bed under overall reducing conditions, conversion oxygen is added to the cooled stream. Such oxygen can be provided directly (i.e. as air), but preferably can be provided by bypassing part of the exhaust stream from the engine. The quantity of conversion oxygen is stoichiometrically in excess of the amount of $NO_x$ but less (stoichiometrically) than the amount of combustibles, in consequence of which $NO_x$ in the stream is oxidized to $NO_2$ at the forward end of the bed, after which the $NO_2$ is reduced in the remainder of the bed by the excess combustibles. Air is added to the resulting stream from the catalytic bed to produce a cooled stream having a stoichiometric excess of oxygen, and the stream is passed over an oxidizing catalyst bed to oxidize remaining excess combustibles. The resultant stream, vastly reduced in $NO_x$ content can then be provided for venting. By means of the invention, the $NO_x$ content can be reduced to less than 25 ppmv—often below 15 ppmv, while CO levels are also brought to well below 50 ppmv.

BRIEF DESCRIPTION OF THE DRAWING

The invention is diagrammatically illustrated, by way of the example, in the drawing appended hereto, in which:

The FIGURE is a schematic block diagram illustrating a cogeneration system in accordance with the invention, and embodying an internal combustion engine as the primary power source.

DETAILED DESCRIPTION OF PREFERRED EMBODIMENTS

Referring now to the FIGURE, a cogeneration system 8 in accordance with the invention is shown. System 8 is designed to produce electrical power, while also providing useful heat output, e.g. in the form of steam or the like. Such a system can be installed at business or educational complexes, such as shopping centers, office parks, universities, hospitals, etc. The reference numeral 10 designates an internal combustion engine which receives a hydrocarbon fuel such as gasoline or preferably, diesel oil, or the like, together with air, and burns the air-fuel mixture to produce a gaseous exhaust or effluent. Other hydrocarbon fuels such as natural-gas fired butane or propane can also be used. The fuel and air are introduced via lines 12 and 14, respectively, and the engine 10 is coupled to a generator 9 to produce electrical power. The engine exhaust gas leaves through a duct 16 typically at an exhaust temperature of about 500°–1000° F., more preferably at about 750°–1000° F. The exhaust typically includes from about 6 to 15% oxygen, more preferably about 6–10%; and includes from about 500 to 2,000 ppmv of $NO_x$, with about 1000 to 1500 ppmv being typical. (All $NO_x$ measurement data herein are expressed as parts per million volume [ppmv] on a dry basis.) The $NO_x$ is mainly in the form of NO. The exhaust stream includes substantial particulate matter in the form of soot. In accordance with one aspect of the invention, there is introduced further amounts of combustibles, i.e. fuel into duct 16, to be admixed with the exhaust gas, the amount depending upon the oxygen content in the exhaust gas from the engine. The added fuel can be any hydrocarbon fuel such as gasoline, diesel oil, propane, natural gas, naptha, and the like; natural gas is preferred. Only fuel is injected at this point. The amount of fuel added is selected to be sufficient to subsequently react with the available oxygen and reduce the $NO_x$ in the exhaust stream. In general from about 1 to 50% stoichiometric excess fuel is used with a preferable excess being from about 5 to 10% stoichiometrically relative to the available oxygen in the exhaust gas from the engine. Thus, the exhaust gaseous stream from the engine is treated, i.e., has fuel added to it, to produce a fuel-rich, fuel-air mixture containing 1% to 50% excess of fuel over the oxygen stoichiometrically present.

The thus-treated exhaust gas from the engine is then passed to a thermal reactor, i.e., an afterburner 18, wherein it is burned at a temperature of about 1800° to 3200° F., preferably from about 2000° to 2400° F. A residence time of about 0.25 to 0.5 seconds is required to ensure that the desired essentially complete burn-out of oxygen in the exhaust and reduction of a portion of the oxides of nitrogen will occur, along with reduction of soot. A greater residence time can be employed, e.g., 1 minute or more, but serves no useful purpose—while increasing the costs of operation.

The gaseous effluent from afterburner 18, is typically at a temperature of 1800°–3200° F., and includes about 750 ppmv of $NO_x$. Its oxygen content is close to zero. The amount of fuel added at 16 will generally be such as to leave about 0.5 to 2% of CO and $H_2$ in the effluent at 20. Such stream is then passed to and through a heat exchanger, which may comprise a waste-heat boiler 22 wherein the effluent is cooled to a temperature of about 600°–1050° F. and preferably to the range of from 750° to 900° F. The heat values in the exhaust stream are thus extracted at boiler 22 to produce steam, which can be removed via line 23 and used for space heating or the like; while at the same time the exhaust stream has been cooled, which is a central consideration for its subsequent treatment.

In accordance with a central aspect of the present invention, the fuel-enriched and cooled exhaust gas from boiler 22, prior to being passed to and through a catalyst bed 25, is admixed with a controlled amount of conversion oxygen, added into duct 21 at point 19. Such oxygen can be added directly with an air supply 29; but preferably can be provided by bypassing some of the engine exhaust from duct 16, via a line 31. This latter approach serves a secondary purpose by reducing the amount of oxygen entering afterburner 18, thereby reducing fuel requirements to the afterburner. The primary purpose of the conversion oxygen is however realized upon the mixture entering catalyst bed 25.

In particular, the amount of conversion oxygen added to the cooled stream from boiler 22 is such as to be (stoichiometrically) in excess of the amount of $NO_x$ in such stream, but less (stoichiometrically) then the amount of combustibles (chiefly fuel) in the stream. Typically the amount of oxygen added is about 0.2 to 0.9%. Bearing in mind that the $NO_x$ in line 21 is chiefly in the form of NO, as the mix enters the front end of the catalyst bed 25, the $O_2$ reacts with the NO to predominantly convert same to $NO_2$. The latter, being more unstable and reactive than NO, is then readily reduced to innocuous compounds by the excess combustibles as the flow proceeds through the remainder of the bed. To be appreciated is that the effective action described is facilitated if not enabled by the fact that the engine exhaust stream has indeed been cooled by boiler 22. Were the gas stream in duct 21 at an elevated temperature, the initial conversion of NO to the more reactive $NO_2$ would not proceed to the extent necessary to enable the action just described—i.e. such high temperatures would favor disassociation of $NO_2$ back into the more stable form of NO.

The overall reaction in bed 25 is therefore seen to be a reducing one wherein the fuel-rich stream at a temperature of about 600° to about 1050° F. is passed over a reducing catalyst, e.g. platinum-rhodium in the zero-valent state supported on a carrier such as alumina, silica or a metal alloy. The making of such catalysts is well known to persons skilled in the art and known noble metal catalysts such as blends of Pd, Pt and Rd can be used, as well as MnO and other metal oxides. There can be in the familiar pellet, ribbon, honeycomb or other forms. Catalyst volumes will vary depending on the particular catalyst used. Ordinarily, the quantity of catalyst and the flow rate are such that the space velocity is typically in the range of 60,000 to 90,000 $hr.^{-1}$, typically being about 80,000 $hr.^{-1}$.

The stream exiting from catalyst bed 25 in conduit 24 is found as a result of the foregoing actions to be remarkably low in $NO_x$, typically including under 15 ppmv of same. However the CO content is typically about 500–2000 ppmv. Substantially no $NO_x$ precursors such as HCN or $NH_3$ have been formed. Air is now introduced into the stream in conduit 24, and the resulting gaseous stream is passed to a further catalyst bed 26 wherein the gas stream is passed over an oxidizing catalyst. The amount of air is added in an amount relative to the stream in conduit 24 such that the resulting stream will contain oxygen stoichiometrically in excess of the amount needed to burn any fuel which may be present in the stream, and will preferably be controlled so that the $O_2$ content in conduit 27 downstream of bed 26 will be about 1.5 to 3%. Either noble metal catalysts, such as platinum, palladium, or rhodium; or base metal oxides, such as copper oxide, chrome oxide, or manganese oxide, or the like, may be used for this purpose. The noble metal catalysts, e.g., platinum or palladium catalysts, are most suitably the noble metals deposited in the zero valent state upon a support, such as alumina, silica, kiesel-guhr, or a metal alloy, and the like. The metal oxide catalysts are also most suitably the metal oxides supported on supports of this character. Various shapes such as pellets, ribbons or honeycombs can be used. The making of such catalysts is well known to persons skilled in the art. Catalyst volumes will vary depending on the particular catalyst used. Ordinarily, the quantity of catalyst and the flow rate are such that the space velocity is generally in the range of 30,000 to 50,000 $hr.^{-1}$—40,000 $hr.^{-1}$ is a typical value. $NO_x$ levels in the conduit 27 are under 15 ppmv, and CO has been reduced to less than 50 ppmv.

While the principle purposes of the invention have been achieved in the gas stream in conduit 27, additional operations may be desired to obtain yet further advantages from the invention. The oxidized gaseous effluent from the bed 26 is thus shown passing from conduit 27 to an economizer or a low-pressure, waste-heat boiler, or the like, indicated at 28. Here the heat content of the oxidized gaseous effluent is extracted to the maximum amount economically feasible. The cooled gas at a temperature of about 300°–400° F. is then discharged through an outlet conduit 30 into a stack 32 and vented to the atmosphere with the assurance that the vented effluent will comply with both $NO_x$ and CO emission standards. It will have a $NO_x$ content of less than 15 ppmv and a CO content of less than 50 ppmv.

It will, of course, be understood in the foregoing description, reference to internal combustion engine, afterburner, boiler, waste-heat boiler, economizer, gas treatment unit, and the like, contemplates utilization of standard equipment well known to persons skilled in the art. The catalyst beds, for example, can be any containers adapted for gas passage and containing an appropriate redox catalyst of a type well known in this art.

Minimizing the formation of oxides of nitrogen in cogeneration, in accordance with the invention, offers several advantages over the current state of the art. This process does not require that a potentially obnoxious gas, such as ammonia, be injected into the system; the reaction conditions do not require that a narrowly-controlled temperature be maintained for the reduction of oxides of nitrogen to occur; the operating conditions are compatible with conventional cogeneration conditions; and greater $NO_x$ and CO reduction efficiencies can be achieved.

It will be understood in view of the foregoing disclosure, that various changes may now be made by those skilled in the art without yet departing from the invention as defined in the appended claims; and it is intended, therefore, that all matter contained in the foregoing description and in the drawing shall be interpreted as illustrative and not in a limiting sense.

What is claimed:

1. A process for low $NO_x$ cogeneration to produce electricity and useful heat, which comprises:
    providing fuel and oxygen to an internal combustion engine connected to drive an electric generator, to thereby generate electricity;
    recovering from said engine an exhaust stream at a temperature of about 500° to 1000° F. which includes from about 6 to 15% oxygen;
    adding to said exhaust stream sufficient fuel to create a fuel-rich mixture, the quantity of fuel being sufficient to react with the available oxygen and reduce the $NO_x$ in said exhaust stream;
    providing said fuel-enriched exhaust stream to a thermal reactor and reacting therein said fuel, $NO_x$ and available oxygen, to provide a heated oxygen-depleted stream;
    cooling said oxygen-depleted stream by passing same through a heat exchanger;
    adding conversion oxygen to said cooled stream from said heat exchanger, and passing the cooled oxygen-augmented stream over a first catalyst bed under overall reducing conditions, the quantity of conversion oxygen added being in stoichiometric excess of the amount of $NO_x$, but less than the amount of combustibles; whereby the $NO_x$ is first oxidized to $NO_2$, and then the $NO_2$ is reduced by the excess combustibles;
    adding air to the resulting stream from said first catalyst bed to produce a cooled stream having a stoichiometric excess of oxygen; and
    passing said stream over an oxidizing catalyst bed to oxidize remaining excess combustible, to thereby provide an effluent stream having environmentally safe characteristics.

2. A method in accordance with claim 1, wherein the oxygen added to said cooled stream from said heat exchanger is provided by bypassing a portion of the exhaust stream from said engine.

3. A method in accordance with claim 1, wherein the resultant stream from said oxidizing catalyst bed is provided for venting.

4. A method in accordance with claim 3, further including recovering heat from the effluent from the oxidizing catalyst prior to said venting.

5. A method in accordance with claim 1, wherein the reaction in said thermal reactor is conducted at a temperature range of from about 1800° to 3200° F.

6. A method in accordance with claim 1, wherein the amount of fuel added to said exhaust stream provides a stoichiometric excess of fuel of up to 150% with respect to available oxygen.

7. A method in accordance with claim 6, wherein the excess fuel is in the range of 105 to 110%.

8. A method in accordance with claim 4, wherein the residence time in said thermal reactor is from about 0.25 to 0.5 seconds.

9. A process as defined in claim 1, wherein said oxygen-depleted stream is cooled to a temperature of about 750° to 900° F. by said heat exchanger.

10. A process as defined in claim 9, wherein said heat exchanger is a boiler.

11. A process as defined in claim 1, wherein the space velocity of said resultant stream passing over said oxidizing catalyst is about 30,000 to 50,000 $hr.^{-1}$.

12. A process as defined in claim 2, wherein the cooled gas vented to the atmosphere is at a temperature of about 350° to 500° F.

13. A process as defined in claim 1, wherein the cooled gas vented to the atmosphere has a $NO_x$ content less than 25 ppmv and a CO content of less than 50 ppmv.

14. A system for low $NO_x$ cogeneration of electricity and useful heat comprising in combination:
    an electrical generator;
    an internal combustion engine connected to drive said electrical generator to produce electricity, said internal combustion engine providing a hot gaseous exhaust stream including elevated $NO_x$ levels and unburned oxygen;
    means for introducing to said internal combustion exhaust stream sufficient fuel to create a fuel-rich mixture;
    an afterburner connected to receive the fuel-enriched exhaust stream from said engine and burn out substantially all of the said oxygen;
    a heat exchanger connected to receive the gaseous flow from said afterburner and cool same to provide an output stream having a temperature below 1050° F., while extracting useful heat from the input stream;
    means for adding controlled quantities of conversion oxygen to the cooled output stream proceeding from said heat exchanger;
    an overall reducing catalyst bed connected to receive the oxygen-augmented cooled air stream from said heat exchanger and pass said flow through said bed; the conversion oxygen acting upon the gaseous flow at the forward end of said bed to oxidize $NO_x$ to $NO_2$, and the excess fuel present in said stream acting in the remainder of said bed to reduce the $NO_2$ to innocuous compounds;

means to add excess oxygen to the flow proceeding from said reducing catalyst bed; and an oxidizer catalyst bed positioned and connected to receive the oxygen-enriched flow from said reducing catalyst bed and oxidize remaining combustibles therein; said catalyst bed having an outlet for the $NO_x$-reduced and combustibles-reduced gases.

15. A system in accordance with claim 14, further including means passing said gases from the outlet of said oxidizing catalyst bed to further heat exchanging means, and to venting means.

16. A system in accordance with claim 14 wherein said means for introducing conversion oxygen comprises a bypass line connected to the exhaust outlet of said internal combustion engine to pass a portion of the oxygen containing exhaust gases to a connecting point at the downstream side of said heat exchanger means.

17. A system in accordance with claim 14, wherein said heat exchanger comprises a waste heat boiler.

* * * * *